Sept. 1, 1959 H. E. McKELVEY ET AL 2,901,866
BENDING GLASS
Filed June 15, 1956 2 Sheets-Sheet 1
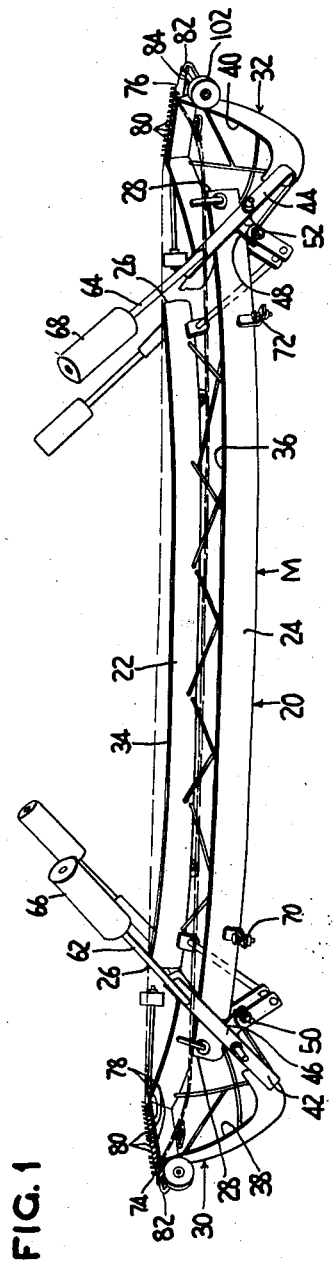
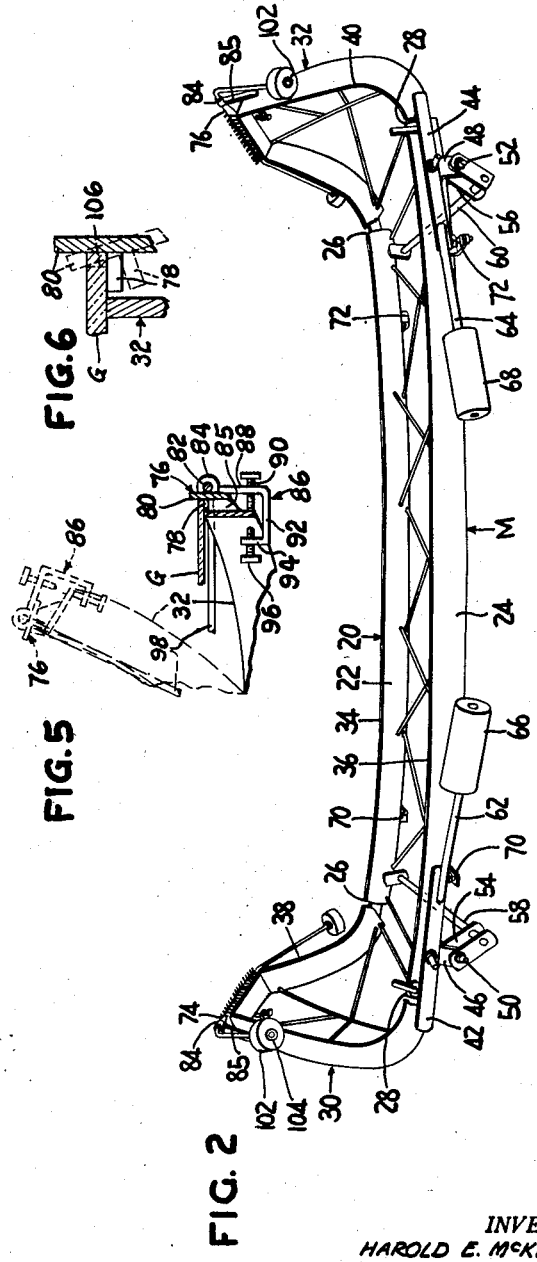
INVENTORS
HAROLD E. McKELVEY and
DAVID H. DOEHLERT
BY
Oscar L. Spencer
ATTORNEY

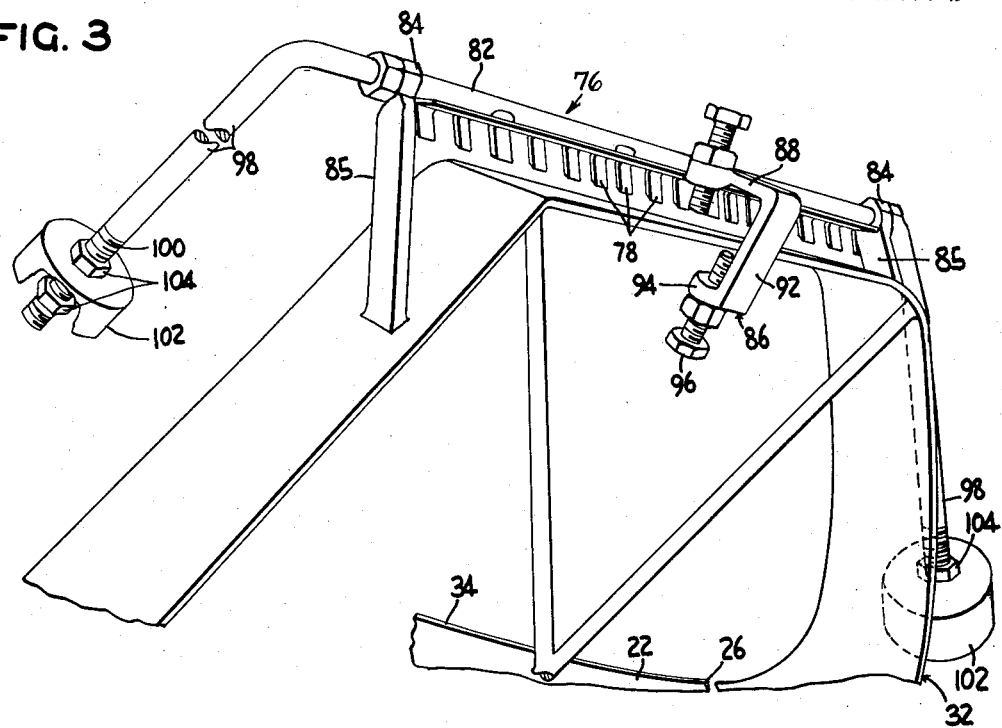
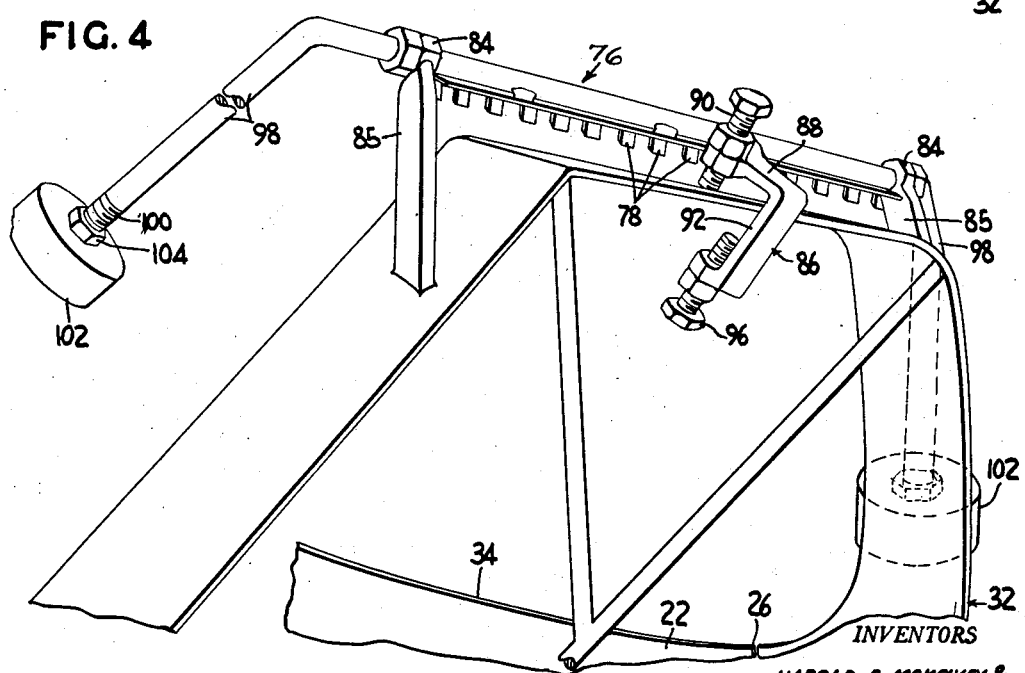

United States Patent Office 2,901,866
Patented Sept. 1, 1959

2,901,866

BENDING GLASS

Harold E. McKelvey, Rural Valley, and David H. Doehlert, New Kensington, Pa., assignors to Pittsburgh Plate Glass Company, County of Allegheny, Pa., a corporation of Pennsylvania Application June 15, 1956, Serial No. 591,696

3 Claims. (Cl. 49—84)

This application relates to improvement in bending glass, and specifically refers to improvements in a method of bending glass sheets involving applying a compressive force to the glass edge extremities and changing the direction of application of the force as the glass is bent to pinch the glass extremities against the upper mold shaping surface and prevent "fall-ins" and unwanted curling of the glass tips.

In bending flat glass sheets into curved shapes, the sheets are preferably first cut to size, then placed upon a skeleton type mold which conforms in contour to the margin of the bent glass sheet, and finally exposed to gradually increasing temperatures until the glass sags to conform to the shape of the mold. The mold may be a single unitary structure or composed of a number of mold sections relatively movable with respect to each other into an open position for supporting unbent glass sheets and into a closed mold position wherein the mold sections move together to form a substantially continuous outline conforming substantially to that desired for the margin of the bent glass both in elevation and in contour.

Molds provided with movable sections are so constructed that the sections tend to move to the closed mold position and have to be opened to receive the unbent glass sheets. According to preferred practice, sectionalized bending molds comprise a fixed center section flanked by end sections rotatable about hinges fixed relative to the center section. The end sections are rotated into the closed mold position by means of counterweights carried by lever arms attached to said end sections. The weight of the unbent glass sheet keeps the end sections from closing until the glass sheet is softened by heat exposure.

When certain shapes of precut glass sheets are mounted on an open mold, it is desirable that the unbent glass extends slightly beyond the mold extremities in order to insure that the glass does not fall from its position of support on the mold and shatter into fragments which disrupt the operation of a bending lehr. However, if the flat glass sheet extends beyond the edge of the mold to a distance greater than about ¼ inch, the glass is marred within its viewing area when mounted in a window frame. This marring is intensified when the weight of the softening glass is borne along a thin line or, in extreme cases, only a point of contact within the marginal periphery of the glass at each extremity of the mold. Also, the extremities of the heat softened glass overhanging the mold extremities tend to sag in a direction opposite from that desired. This reverse sagging, once developed, cannot be eliminated by subsequent glass bending upon closing of the mold.

When a glass sheet is to be bent to severe curvatures, the difference in length between the unbent glass sheet and the chord distance between the extremities of the sheet after bending is considerable. Occasionally, during hard usage without proper maintenance, sectionalized molds do not function properly, because the bearing hinges about which the end sections rotate may develop frictional resistance inhibiting free rotation. Thus, it is possible for an end section at one extremity to rotate in response to the softening of the glass while the opposite extremity is prevented from rotation because of a combination of friction and inertia. Such unequal rotation of the end sections may displace the glass sheet relative to the mold and result in a "fall-in," a condition where the glass sheet slides off the mold.

The present invention is especially designed to prevent fall-ins from occuring when glass sheets are bent on sectionalized skeleton bending molds.

The present invention provides this improvement by incorporating in sectionalized skeleton glass sheet bending molds glass edge contacting members which are pivoted relative to the end sections to provide a compressive force to opposite glass edge surfaces at opposite extremities of the glass sheet to be bent while the mold is open. As the mold moves to its closed position, the force applied to the opposite glass edge surfaces is changed in direction so that an increasingly larger proportion is applied in a thickness direction to the upper corner of the edge surface initially contacted. This causes the extremities of the glass to be pinched against the upper shaping surface of the mold at the mold extremities, thereby preventing sliding that results in fall-ins.

Pinching the extremities of the glass sheet against the mold extremities during the final stages of the bending cycle also inhibits the tips of the glass sheets from curling off the mold tips and minimizes marking. In prior art molds of which Smith et al. Patent 2,518,951 is exemplary, tip curling has been prevented by glass contacting members which engage the glass tips throughout substantially the entire bending cycle. In such molds, the glass edges are marred even when special materials are used for the glass contacting members.

In a particular apparatus especially constructed to perform the method of the present invention, specially constructed glass edge supporting elements are attached securely to a hinge rod mounted on bearing supports fixed to each end section. Counterweighted lever arms are fixed to the hinge rod extremities and oriented in such a manner to provide a minimum rotational moment to rotate the glass edge contacting member relative to the end section during the initial phase of the bending cycle and to increase the moment of force causing pinching of the glass sheet extremity on the upper shaping surface of each end section's outboard extremity as the bending progresses.

This invention will be understood more clearly upon studying the following description taken in conjunction with the accompanying drawings wherein the various reference numerals applied relate to the same structural elements throughout the drawings. It is understood that the description of the particular embodiment is for purposes of illustration rather than limitation.

In the drawings forming part of the present disclosure,

Figure 1 is a longitudinal elevation partially in perspective of a typical mold provided with a device according to the present invention showing the mold in the open position.

Figure 2 is a view similar to Figure 1 showing the mold in its closed position.

Figures 3 and 4 are detailed perspective views illustrating details of the structural elements which are included in the present invention.

Figure 5 is a fragmentary sectional view of a longitudinal extremity of a bending mold provided with glass edge supporting elements, constructed according to the present invention, showing in full lines the relative position of a mold extremity and its pivotally attached supporting element in the open mold position and also showing in phantom lines the relative positions of the mold extremity and its pivotally attached supporting elements in the closed mold position.

Figure 6 is an enlarged sectional view showing the relative positions of the supporting element with respect to the mold extremity to which it is pivotally attached by superimposing in phantom the position of the supporting element relative to the mold extremity in the closed mold position, and assuming the mold extremity does not rotate from the open to the closed mold position.

Referring to the drawings, a mold is generally shown at M provided with a center section 20 including a pair of longitudinally extending center section rails 22 and 24. The longitudinal extremities of the rails are designated 26 and 28. Beyond the outboard extremities are located end sections 30 and 32. Each of the latter is of substantially U-shaped outline and extends as a continuous rail from an outboard extremity 26 of rail 22 to the laterally opposite outboard extremity 28 of rail 24. Each of the rails 22, 24, 30 and 32 is provided with an upper shaping surface 34, 36, 38 and 40, respectively, that conforms in elevation and outline to a portion of the margin of the bent glass sheet.

Attached to opposite inboard extremities of each end section 30 and 32 are inwardly extending straps 42 and 44 respectively. These straps are provided with downwardly extending ears 46 and 48. The ears are apertured about pivot rods 50 and 52 respectively.

Pivot rods 50 and 52 are fixed in turn to flanges 54 and 56, respectively, which extend upwardly from opposite extremities of brace rods 58 and 60 which are used to support the mold upon a carriage (not shown). Inwardly of the pivot rods 50 and 52, straps 42 and 44 have attached thereto lever arms 62 and 64, respectively. These lever arms contain counterweights 66 and 68. Stops 70 and 72 extend laterally outwardly from the under surface of rails 22 and 24 adjacent their extremities in alignment with the plane of rotation of lever arms 62 and 64, respectively, to provide an abutment to terminate rotation of the end sections 30 and 32 relative to the center section 20 at the proper relative orientation.

Glass edge indexing and supporting members 74 and 76 are located outboard of the longitudinal extremity of each end section 30 and 32. Each of the indexing members 74 and 76 comprises a series of tabs 78 extending in the plane of the bottom surface of the glass in the open mold position alternating with a series of tabs 80 which lie in a plane angularly disposed relative to the first set of tabs. These tabs 80 are oriented parallel to the edge surfaces of the unbent glass sheets mounted on the mold for bending.

The members 74 and 76 are each fixed to a hinge rod 82 that is supported at its extremities by bearing brackets 84. The latter are secured to the outer surfaces of the end sections by braces 85. A U-shaped bracket 86 is attached to hinge rod 82 as by welding. The U-shaped bracket 86 includes a first leg 88 apertured to receive a set screw 90, a cross leg 92 and a second apertured leg 94 adapted to receive a second set screw 96. Each extremity of the rotatable hinge rod 82 extends into a lever arm 98 which contains an externally threaded portion 100 upon which is mounted a counterweight 102. The position of the latter along the lever arms 98 is determined by the position of adjustment nuts 104.

Set screw 90 is adjusted to limit the rotation of the hinge rod 82 outwardly to such an extent that the tabs 78 do not rise above the plane of the open mold defined by the rail extremities 26 and 28 of the center section rails and the outboard extremity of the end sections 30 and 32. This enables the flat glass sheet to be mounted in as low a position as possible on the bending mold, a factor that has been found to be very important in securing optimum bending of the glass sheets as recited and claimed in copending application Serial No. 438,011 of Lloyd V. Black and Harold E. McKelvey, filed June 21, 1954. Also, the tabs 80 are so disposed on the end sections that when the precut glass sheets are loaded properly on the open mold with the indexing members 74 and 76 at their outermost positions permitted by set screws 90, the outboard extremities of the glass sheet are equally distant from the adjacent tabs 80 and resting either on tabs 78 or spaced above the latter an insignificant amount.

By supporting the glass sheets at the extremities of the center section rails as well as at the end section extremities, there is no tendency for the unbent glass to tilt, even if the sheet has an outline such that its center of gravity falls to one side of the longitudinal axis connecting the extremities of the flat glass sheet.

The unbent glass is loaded properly on the mold for bending as described above with hinge rods 82 rotated so that set screws 90 contact the outer surface of end sections 30 and 32. The weight of the rigid glass keeps end sections 30 and 32 spread open. When lever arms 98 are released, tabs 80 apply a minimum compressive force against the extremities of the glass sheet and no force on the upper glass surface.

As the glass is softened, the bending moments provided by the counterweights 66 and 68 act through lever arms 62 and 64 to rotate the end sections 30 and 32 about pivot rods 50 and 52 and lift the softened glass extremities. The glass G slides relative to the end section rails. The lever arms 98 rotate relative to the end sections to follow the glass extremities. Tabs 80, which were parallel to the glass edge 106 when the mold was open, thus are free to rotate more rapidly than the end sections. This more rapid rotation establishes a component of force in a thickness direction on the upper edge corners of the glass extremities. This component of force increases with continued rotation of the indexing tabs 80 relative to the end sections, until the component of force is enough to pinch the upper edge corner of the glass so that the glass extremity is pinched between the tabs 80 and the mold shaping surface at the outboard extremities of end sections 30 and 32, thus preventing the glass from slipping too far inwardly at either extremity and also inhibiting curling of the glass tips.

Rotation of member 74 relative to end mold section 30 and that of member 76 relative to end mold section 32 is limited by the contact of the second set screw 96 with the inner surface of the respective end mold section. This limitation of rotation also limits the pinching force exerted on each glass sheet extremity between the tabs 80 and the mold extremity.

Since the pinching force is applied to the upper edge corner of the glass sheet for a small portion of the bending cycle only, the glass is not stressed in this region as much as prior art devices which required the glass to be contacted throughout the entire bending cycle. During the major portion of the duration of the bending cycle, the glass remains still. It is only in the last few moments of the bending cycle that the bending occurs. Hence, glass pinching occurs for a limited interval only, the glass laden molds being removed from the glass softening temperature atmosphere as soon as the bend is completed. Lehr speeds are adjusted accordingly to insure such prompt removal.

What is claimed is:

1. In a method of bending glass sheets on skeleton molds having an upper shaping surface to which the glass sheets are to be bent wherein an unbent glass sheet is mounted on the mold and subjected to gradually increasing temperatures to soften the glass sheet, thus enabling the latter to conform to the mold shaping surface, the improvement comprising initially maintaining the upper edge corners of the glass sheet free from a force component in the direction of its thickness while applying opposing compressive forces to opposite edge surfaces of the unbent glass sheet and gradually changing the direction of application of the compressive force relative to the glass during the latter stages of the bending process so that an increasing proportion of the force is applied to the upper edge corner of the opposite edges of the glass sheet in the direction of its thickness to pinch the latter to the corresponding extremities of the mold shaping surface.

2. In a method of bending glass sheets on skeleton molds having an upper shaping surface to which the glass sheets are to be bent wherein an unbent glass sheet is mounted on the mold and subjected to gradually increasing temperatures to soften the glass sheet, thus enabling the latter to conform to the mold shaping surface, the improvement comprising initially maintaining the upper edge corners of the glass sheet free from a force component in the direction of its thickness while applying small opposing compressive forces to opposite edge surfaces of the unbent glass sheet, gradually changing the direction of application of the force relative to the glass from the opposing edge surfaces to the upper edge corners of the glass sheet, and increasing the force applied to the glass sheet as the bending cycle progresses in order to pinch the opposite extremities of the glass sheet to the corresponding extremities of the mold shaping surface.

3. In a method of bending glass sheets on skeleton molds having an upper shaping surface to which the glass sheets are to be bent wherein an unbent glass sheet is mounted on the mold and subjected to gradually increasing temperatures to soften the glass sheet, thus enabling the latter to conform to the mold shaping surface, the improvement comprising initially supporting the flat glass sheet along its bottom surface at a series of spaced points intermediate its extremities on spaced points of support along the mold shaping surface and at its longitudinal extremities on supports located beyond the mold extremities and applying a gradually increasing component of force on the upper edge corner of each glass sheet extremity in the direction of its thickness while lifting the heat-softened glass sheet extremities.

References Cited in the file of this patent
UNITED STATES PATENTS

| | | |
|---|---|---|
| 682,570 | Sage | Sept. 10, 1901 |
| 760,959 | Sonnington | May 24, 1904 |
| 1,999,558 | Black | Apr. 30, 1935 |
| 2,003,383 | Miller | June 4, 1935 |
| 2,330,349 | Galey | Sept. 28, 1943 |
| 2,500,278 | Dunipace | Mar. 14, 1950 |
| 2,518,951 | Smith | Aug. 15, 1950 |
| 2,554,572 | Jendrisak | May 29, 1951 |
| 2,674,067 | Reggiani | Apr. 6, 1954 |
| 2,683,334 | Rugg et al. | July 13, 1954 |
| 2,691,854 | Rugg | Oct. 19, 1954 |
| 2,695,476 | Jendrisak | Nov. 30, 1954 |